No. 877,479. PATENTED JAN. 28, 1908.
J. C. BASHFORD.
VEHICLE GEAR.
APPLICATION FILED APR. 13, 1907.
2 SHEETS—SHEET 1.
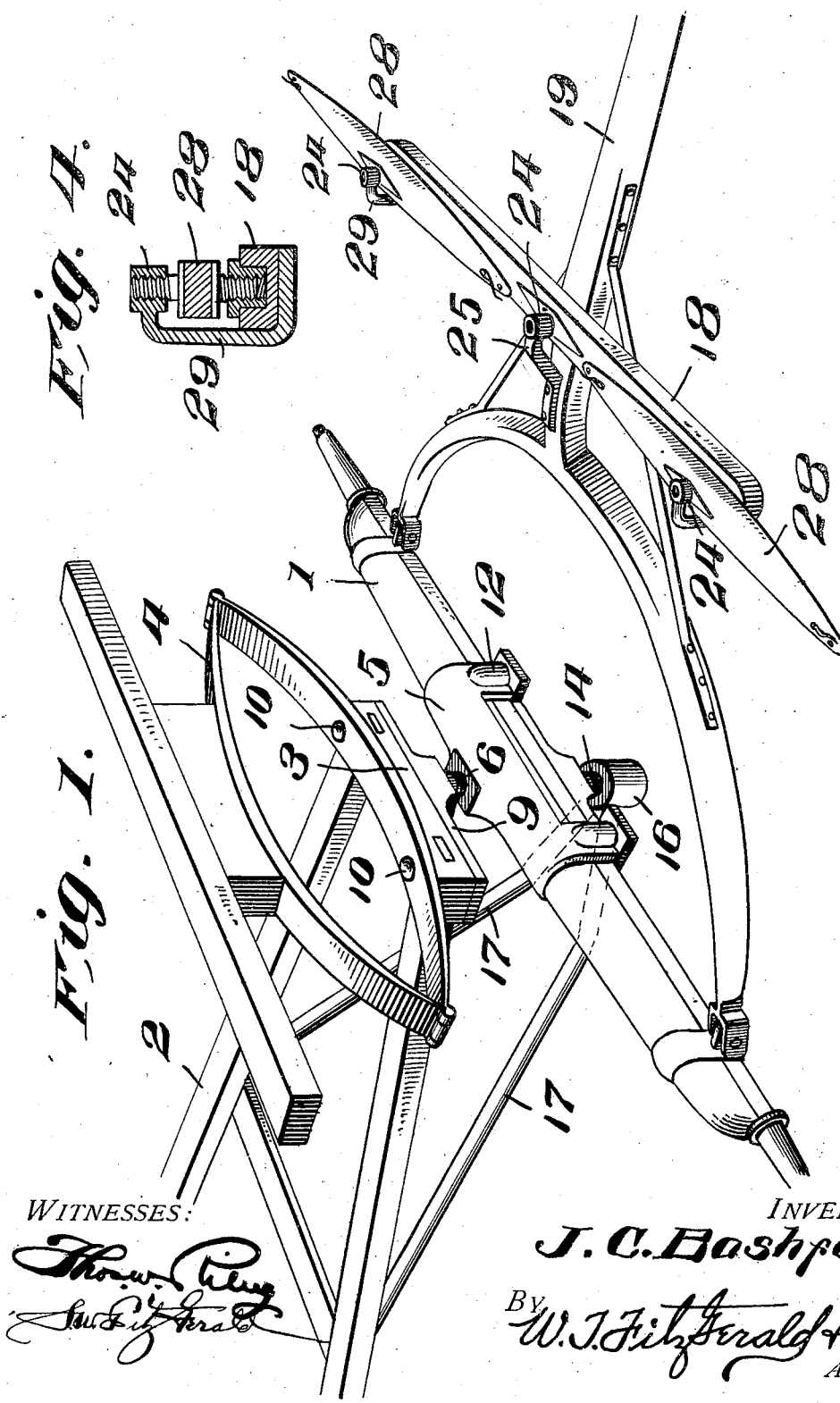
WITNESSES:
INVENTOR
J. C. Bashford
By W. J. Fitzgerald & Co.
Attorneys

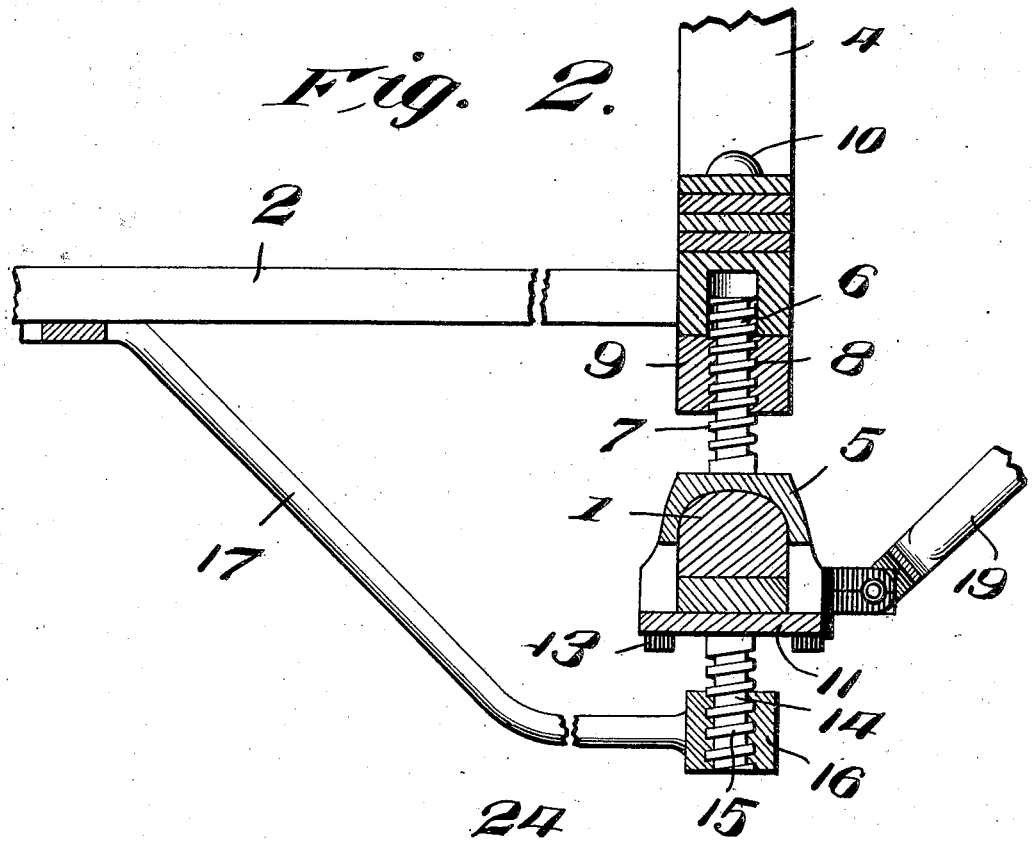
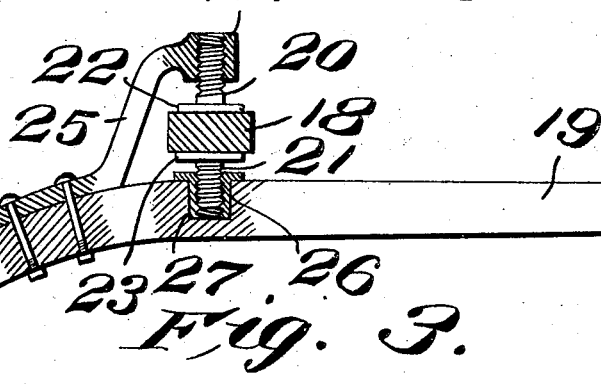

UNITED STATES PATENT OFFICE.

JOHN COATES BASHFORD, OF YONKERS, NEW YORK.

VEHICLE-GEAR.

No. 877,479.        Specification of Letters Patent.        Patented Jan. 28, 1908.

Application filed April 13, 1907. Serial No. 367,968.

*To all whom it may concern:*

Be it known that I, JOHN COATES BASHFORD, a citizen of the United States, residing at Yonkers, in the county of Westchester and State of New York, have invented certain new and useful Improvements in Vehicle-Gears; and I do hereby declare the following to be a full, clear, and exact description of the invention, such as will enable others skilled in the art to which it appertains to make and use the same.

My invention relates to new and useful improvements in attachments for vehicle gears and my object is to provide means to compensate for the wear of the pivoted parts of the vehicle.

A further object is to provide means for varying the height of the front portion of the vehicle with respect to its supporting axle.

Other objects and advantages will be hereinafter referred to and more particularly pointed out in the claims.

In the accompanying drawings which are made a part of this application, Figure 1 is a detail perspective view of the front portion of the running gear of a vehicle showing the usual form of pole and swingle trees attached thereto. Fig. 2 is a central vertical sectional view through the front axle of the vehicle and parts carried thereby. Fig. 3 is a detail sectional view through the central portion of the pole and showing the manner of securing the double tree thereto, Fig. 4 is a detail sectional view through the double tree and showing the manner of securing the swingle tree thereto.

Referring to the drawings in which similar reference numerals designate corresponding parts throughout the several views 1 indicates the front supporting axle of a vehicle which is of the usual or any preferred form and is adapted to carry the front end of a reach bar 2, the reach bar in this instance being formed of two bars and connected together at their forward end by a head block 3 upon which is mounted the usual form of supporting spring 4.

Vehicles as commonly manufactured at the present time employ a king-bolt or fifth wheel to secure the two supporting parts of the vehicle to the front axle but it is my desire to dispense with the fifth wheel and instead employ suitable supporting means between the axle and parts carried thereby to prevent wear between the parts and at the same time provide the usual pivotal connection and in this instance I employ a clip 5 which is disposed over the central portion of the axle 1 and is provided with an upwardly extending shaft 6 which is provided on its exterior with threads 7 which are adapted to engage a threaded bore 8 in a plate 9, said plate being secured to the lower edge of the head block 3 in any preferred manner as by bolts 10.

An auxiliary plate 11 is disposed below the axle 1 and coincident in extent to the clip 5, said auxiliary plate being employed to secure the clip to the axle by directing the threaded stems 12 on the clip 5 through openings in the auxiliary plate and securing the same therein by means of nuts 13. The auxiliary plate is likewise provided with a depending shaft 14 which is likewise provided on its exterior with threads 15 which are adapted to enter a threaded socket 16 on the end of a brace-bar 17, said brace bar being bifurcated and extended rearwardly from the front axle and in engagement with the reach bars 2.

In securing the parts of the vehicle together the depending shaft 14 is inserted into the socket 16 and the clip and auxiliary plate placed in position on the axle after which the plate 9 is directed on to the shaft 6 and the plate then secured to the head block 3 and the proper adjustment of the head block may be had by regulating the distance to which the shafts are directed into their respective sockets.

The threads upon the respective shafts are formed alike so that when the axle is turned, one of the shafts will enter its respective socket while the opposite shaft will leave its respective socket and vice versa when the axle is moved in the opposite direction. The threads upon the shafts form the bearing surface for the parts and enable me to dispense with the usual form of fifth wheel or kingbolt.

In Fig. 3 of the drawing, I have shown the manner of securing the double tree 18 to the pole 19 of the vehicle, and in this instance I dispense with the clip 5 and provide the shafts 20 and 21 with base plates 22, and 23, respectively which are secured on opposite sides of the double tree 18 and the shaft 20 is extended upwardly and into a threaded socket 24 carried by the usual form of retaining arm 25 which in turn is fixed to the inner end of the pole 19 while the shaft 21 extends into a threaded thimble 26, seated in a bore 27 in the pole, said shafts 20 and 21 being threaded similarly to the shafts 6 and 14 and operating in the same manner.

In Fig. 4 I have shown the manner of securing the swingle trees 28 to the ends of the double tree 18 and in this instance I employ the same construction as is used for mounting the double tree upon the pole, except that the socket 24 is carried by a clevis 29, the lower end of which is secured in any manner to the lower surface of the double tree.

It will now be seen that I have provided a very cheap and economical means for securing the pivoted members of the vehicle together and one that will materially reduce the wear of the parts and prevent rattling of the same and it will also be seen that the parts may be readily adjusted to raise and lower the parts of the vehicle supported thereby and while I have shown and described the device as applied to use in connection with a vehicle drawn by draft animals, it will be understood that said parts may be successfully applied to use in connection with automobiles, tenders of locomotives or any other device where it is necessary to have pivotal bearings.

What I claim is:

1. The herein described attachment for vehicles comprising a pair of shafts, threads extending from end to end of said shafts, means to secure said shafts to parts of the vehicle and threaded sockets for said shafts, means to secure said sockets to parts of the vehicle, the threads on said shafts being so arranged that when the part of the vehicle carrying the shafts is rotated one of the shafts will enter its respective socket while the opposite shaft will leave its respective socket.

2. The herein described attachment for vehicles comprising the combination with the swinging axle of a vehicle; of a pair of shafts one of which extends above and the other below the said axle, means to secure said shafts to the axle, said shafts being similarly threaded throughout their lengths, threaded sockets for said shafts, means to secure said sockets to parts of the vehicle, the threads upon said shafts and in said sockets being so arranged that one of the shafts will enter its respective socket and the opposite shaft leave its respective socket when the axle is swung.

3. The herein described attachment for vehicles comprising the combination with a swinging portion of the vehicle; of a pair of oppositely disposed shafts, means to secure the shafts to the swinging portion of the vehicle, said shafts being similarly threaded and a socket for each of said shafts having threads therein to engage the threads on the shafts whereby when the parts of the vehicle are swung they will be raised or lowered.

4. The herein described attachment for vehicles comprising the combination with a swinging axle; of a clip adapted to extend over said axle, an auxiliary plate below said axle, means to secure the clip to said auxiliary plate, an upwardly extending shaft on said clip, a depending shaft on said plate, said shafts being similarly threaded throughout their length, a plate having a bore therein adapted to receive the upwardly extending shaft, a socket for the depending shaft and means to secure said plate and socket to the parts of the vehicle.

In testimony whereof I have signed my name to this specification in the presence of two subscribing witnesses.

JOHN COATES BASHFORD.

Witnesses:
HENRIETTA BASHFORD,
SAMUEL MARE BASHFORD.